US006786497B1

(12) United States Patent
Olszewski (10) Patent No.: US 6,786,497 B1
(45) Date of Patent: Sep. 7, 2004

(54) TRANSMISSION SYSTEM FOR CYCLE TYPE VEHICLE

(76) Inventor: Richard A. Olszewski, 370 Floridian Ave., St. Augustine, FL (US) 32080

( * ) Notice: Subject to any disclaimer, the term of this patent is extended or adjusted under 35 U.S.C. 154(b) by 174 days.

(21) Appl. No.: 10/141,203

(22) Filed: May 9, 2002

(51) Int. Cl.⁷ .................................................. F16H 3/30
(52) U.S. Cl. ......................................... 280/260; 74/351
(58) Field of Search ................................ 280/260, 238; 74/351, 416, 393, 395

(56) References Cited

U.S. PATENT DOCUMENTS

| | | | | |
|---|---|---|---|---|
| 536,550 | A | * 3/1895 | Snyder ........................ | 280/260 |
| 589,266 | A | * 8/1897 | Nedland et al. ............. | 280/260 |
| 707,359 | A | * 8/1902 | Scharbach .................... | 74/347 |
| 1,334,108 | A | * 3/1920 | Melnichuk ................... | 280/238 |
| 2,033,850 | A | * 3/1936 | Roberts ........................ | 74/351 |
| 2,561,960 | A | * 7/1951 | Weaver ........................ | 74/449 |
| 3,863,503 | A | * 2/1975 | Loeb et al. ................... | 74/347 |
| 4,961,719 | A |   10/1990 | Wildermuth | |
| 4,976,348 | A |   12/1990 | Berry | |
| 5,228,354 | A | * 7/1993 | Oosterwal et al. ............. | 74/347 |
| 5,251,504 | A | * 10/1993 | Summerville et al. ........ | 74/368 |
| 5,496,049 | A |   3/1996 | Escobedo | |
| 5,622,081 | A |   4/1997 | Clements | |
| 5,924,950 | A |   7/1999 | Pusic | |
| 6,158,296 | A |   12/2000 | Denance | |

* cited by examiner

Primary Examiner—Lesley D. Morris
Assistant Examiner—Tony Winner
(74) Attorney, Agent, or Firm—William B. Noll (57) ABSTRACT

A power transmission system for a cycle type vehicle having at least a pair of wheels, such as a bicycle, for providing multiple speeds thereto. The system comprises a housing mounting a planar, circular pinion gear plate, mounted for rotation on a pedal powered rotary shaft, wherein the pinion gear plate has a series of recesses arranged in plural concentric rings about the rotary shaft. Within the housing is a pinion gear and clutch cluster assembly, and a shifting mechanism, where the latter mounts plural pinion gear and clutch assemblies, one for each of the circular rings of recesses on the pinion gear plate, where a selected pinion gear and clutch assembly engages a set of recesses within the rotating pinion shaft and transmits power via an attached drive shaft to a wheel of the vehicle, which incorporates a similar power transmission system for receiving rotating power from the above mentioned power transmission system to produce forward motion of the cycle type vehicle.

12 Claims, 13 Drawing Sheets

TRANSMISSION SYSTEM FOR CYCLE TYPE VEHICLE

FIELD OF THE INVENTION

This invention is directed to the field of bicycle-type transmission systems, more particularly to a system that includes a pinion gear plate assembly for transferring rotational power to the pinion gears on a pinion shaft, where the system hereof is intended as a replacement to the conventional sprockets and chain drive mechanism.

BACKGROUND OF THE INVENTION

The present invention relates to a unique transmission system for a cycle type vehicle, such as a bicycle, where the cycle type vehicle comprises a pedal rotary member in driving communication with a driven wheel or wheels. The basic design of standard bicycles has not changed significantly over a number of years. Typically, such standard bicycle is provided with a single sprocket for transmitting chain power from the pedal powered cranks to the rear or driven wheel. Although this configuration is mechanically simple and easy for the operator to control, it possesses the disadvantage that traveling over hilly or uneven terrain can be difficult. Specifically, the rider cannot shift to a lower gear ratio to promote easier travel over such terrain.

To improve mobility, bicycles have employed chain and multi-sprocket type transmissions for several years. Typically, they include an array of sprockets mounted on both the pedal driving and rear driven shafts, where a current system is a ten-speed bicycle. These sprockets offer the rider a selectable choice of drive ratios thereby allowing the rider to tailor the drive to his or her own level of comfort or ability. The chain which transfers power from the driver to the driven shaft is shifted by means of a "derailleur" mechanism which moves the chain laterally from sprocket to sprocket. Although this drive system is highly efficient, light weight, cost effective and simple, it nevertheless possesses a number of tangible short-comings and disadvantages.

One such disadvantage, for example, is the relative complexity of the derailleur type transmission. Each lateral movement of the chain from one sprocket to another requires a corresponding compensation in the length of the chain. This unfortunately necessitates the use of a self-adjusting type tensioner which adds further complexity to the design. Moreover, any slight misalignment of the cable driven front and rear derailleur mechanisms can create an inefficient "between gears" condition.

To overcome this disadvantage, the prior art has attempted to develop modified power transmission systems for bicycles, where such attempts are illustrated and described in the following U.S. Patents:

U.S. Pat. No. 6,158,296, to Denance, teaches a transmission comprising a gear assembly for transmitting a rotary motion from a driving shaft to a driven shaft, with variable gear ratio where the two shafts and are not coaxial. This transmission consists of a gear-wheel axially split into two half-gear wheels and one axially mobile relative to the other, and also relative to one of the shafts supporting them. The two half-gear-wheels are fixed in rotation relative to this shaft. Additionally, a plate, integral with the other shaft, comprises on at least one of its surfaces several gear teeth, concentric with this shaft, cooperating with the gear-wheel, and elements for axially displacing the two half-gear-wheels to alter the geared concentric tooth, thereby shifting the gear ratio;

U.S. Pat. No. 5,924,950, to Pusic, discloses a transmission for transmitting power from an input shaft to a driving wheel and changing rotating speed ratios. The transmission comprises a drive shaft, a set of drive gears, a driven shaft, a set of driven gears, one counter gear, one return gear including a hub, a planetary gear and sprocket assembly, and a braking mechanism which alternates the operation of the planetary gear. By alternately engaging the different drive gears, the transmission enables the change of an input rotating speed and by stopping the ring gear in the planetary assembly it further multiplies the change of the input rotating speed. Within a very compact and user-friendly design, the transmission provides a full range of speeds and enables smooth power flow resulting in the decrease of power loss in pedal propelled vehicles;

U.S. Pat. No. 5,622,081, to Clements, relates to a multiple speed shaft drive for a bicycle, including a forward disk having a plurality of concentrically disposed ring gears, wherein the forward disk is connected with the pedal crank of the bicycle; a rearward disk having a plurality of concentrically disposed ring gears, wherein the rearward disk is connected to the rear wheel tub; a forward drive shaft; a rearward drive shaft; a free wheel mechanism connecting the forward drive shaft to the rearward drive shaft; a forward pinion gear slidably mounted to the forward drive shaft; a rearward pinion gear slidably mounted to the rearward drive shaft; a forward gear shift mechanism for moving the forward pinion gear into gearing engagement with a selected ring gear of the forward disk; a rearward gear shift mechanism for moving the rearward pinion gear into gearing engagement with a selected ring gear of the rearward disk; and a clutch mechanism which automatically disengages the rearward hub from gearing engagements with the rearward pinion gear whenever a gear shift is made with a shift control operated by the cyclist;

U.S. Pat. No. 5,496,049, to Escobedo, is directed to a drive mechanism for a cycle vehicle for selectively importing a driving force from a pedal operated front gear drive section to a rear gear driven section via a variable transmission. The drive section and the driven section include a plurality of concentric circular rows of gear teeth selectively engageable by front and rear intermediate gears positionable on linear guide rods by a variable combination of manually settable transmission gears. The drive and driven section gears constitute shift gears adapted to achieve gear speed change and provide a driving force to the rear wheel via rotating shafts;

U.S. Pat. No. 5,251,504, to Summerville, Jr. et al., teaches an automatic transmission for driving a rotating wheel having an axle mounted onto a support frame, especially a bicycle frame. The transmission comprises a power input means such as a dual crank-pedal mechanism attached to the frame for receiving power input along with a drive shaft. A plurality of driving elements are mounted for rotation freely about the drive shaft and have engagement means such as sprockets on the surface thereof, one of the driving elements being a lead driver connected to the drive shaft for driving rotation in one direction along with the drive shaft, the driving elements being located at successively greater distances along the shaft from the axle with the lead driver being the farthest from the axle. A drive plate is coupled to the rotating wheel and has on its surface a plurality of concentrically arranged engagement means such as holes which mate with the sprockets on the driving elements for transmitting rotational power from the drive shaft to the drive plate. Means are provided for transferring torsional thrust between the plurality of driving elements and for applying an axial load to the plurality of driving elements along the drive shaft;

U.S. Pat. No. 4,976,348, to Berry, discloses a changeable speed gear attachment for bicycles, including the first gear for interconnection with the front sprocket of a standard bicycle, and a second gear for interconnection with the rear sprocket of a standard bicycle. Shifting means, comprising a plurality of gears and an associated shift lever and transmission cable, are provided. The device may be mounted on the rear frame members of the bicycle without modification of the frame, and the device may be used with bicycles having either a standard chain transmission or a direct-drive chainless transmission; and, U.S. Pat. No. 4,961,719, to Wildermuth, relates to a drive transmission for a work producing mechanism, such as a bicycle or other vehicle, in which a carrier member is mounted on a rotatable crank shaft, and has a plurality of spaced, pivotally mounted segments, with each segment carrying a rotatable drive element, such as a chain-engageable sprocket. An endless, flexible member, such as a roller chain, is coupled with the sprocket, each segment being in mesh with a free-wheeling gear rotatably mounted on the crank shaft. A chain takeup damper is carried in spaced relationship to the crank shaft and applies tension to a part of the chain at all times. As torque requirements on the crank shaft increase, the other part of the chain increases in tension causing the sprockets to be rotated toward the crank shaft to increase the drive ratio of the transmission. A resilient endless flexible band biases the segments outwardly of the crank shaft and into a maximum drive ratio. A servo system can be used to cause changes in the drive ratio which are dependent upon crank shaft speed instead of torque on a crank shaft.

While the foregoing prior art offer a number of systems for replacing the conventional power transmissions for bicycles, for example, such systems are generally complex and do not offer the simplicity of the present invention. The manner by which this invention improves upon the prior art will become more apparent in the description which follows, particularly when read in conjunction with the accompanying drawings.

SUMMARY OF THE INVENTION

This invention is directed to a unique power transmission system for cycle type vehicles, such as bicycles. The cycle type vehicle features, in part, a frame mounting a pedal rotating member, a driven rear wheel, optionally a driven front wheel, and a transmission assembly extending between said pedal rotating member and said driven wheel(s). The transmission assembly comprises a generally circular housing having a pair of spaced apart side faces separated by a peripheral wall, where the housing includes a pinion gear plate rotatable within said housing. The pinion gear plate is rotatable about a shaft having a pair of oppositely oriented pedal arms, each mounting a pivotal pedal for rotatable movement by the vehicle operator. The pinion gear plate features a plurality of gear teeth openings or recesses arranged in a series of concentric rings from the periphery of the plate towards the shaft. Within the housing and cooperating with the openings or recesses in the pinion gear plate is one or a pair of radically oriented cluster assemblies and shifting mechanisms, where a given cluster assembly includes a plurality of pinion gears and clutch assemblies, one for each concentric ring of openings or recesses in the pinion gear plate, a power driving shaft from the mechanism to a driven wheel, and a means to engage or disengage a selected gear with a sliding shifting mechanisms. For driving the rear wheel an inflexible driveshaft mounting a like transmission drive assembly is preferred, while a flexible power transmission shaft is preferred for the optional driven front wheel mounting a like transmission drive assembly. Means are provided for remotely engaging the pinion gear clutch mechanism by the operator, where said pinion gears and clutch assemblies are mounted on a rotatable pinion shaft having a series of concentric slots encircling about the diameter of the pinion shaft, where said clutch mechanism includes a clutch hub which houses a plurality of spring biased pins for engaging said slots of the pinion shaft, where the pins of the clutch mechanism are pushed inward into the slots in the pinion shaft by an encircling and constricting band acted upon by the sliding mechanism.

Accordingly, a feature of this invention is the provision of a unique environmentally sealed and internally lubricated power transmission system for a cycle type vehicle, such as a bicycle, that offers the operator the choice of selected speeds without the complexities of conventional transmission systems.

Another feature of the invention is the use of a rotary pinion gear plate and cooperating cluster assembly and shifting mechanism mounted within a housing, where the pinion gear plate features a plurality of openings or recesses, arranged within plural concentric rings, and said cluster assembly shifting mechanism selectively cooperates with said openings or recesses to allow for differing speeds.

A further feature hereof includes a shifting mechanism having a sliding member with a pair of angled camming slots, where clutch shifting pins move along said camming slots to effect opening and closing of an encircling ring to selectively engage or lock the clutch of the desired pinion gear to the pinion shaft for powering the driven wheel.

These and other features of the invention will become more apparent from the following description, especially when read by those skilled in the art.

DETAILED DESCRIPTION OF PREFERRED EMBODIMENT

The present invention relates to a unique power transmission system for cycle type vehicles, such as two and three wheel vehicles, where such vehicles may comprise a frame mounting a pivotal front member and freely rotating wheel for steering the vehicle, a pedal member rotatable on a shaft, or crank shaft, a driven rear wheel, and a power transmission assembly operating between said pedal member and a preferred driven rear wheel, although both front and rear wheels may be driven. The power transmission system of this invention will now be described with regard to the accompanying Figures, where like reference numerals represent like components or features throughout the several views. It will be noted that the further description will be directed to the power transmission system hereof for a bicycle, but it should be understood that it is just as applicable to other cycle type vehicles.

Figure 1:
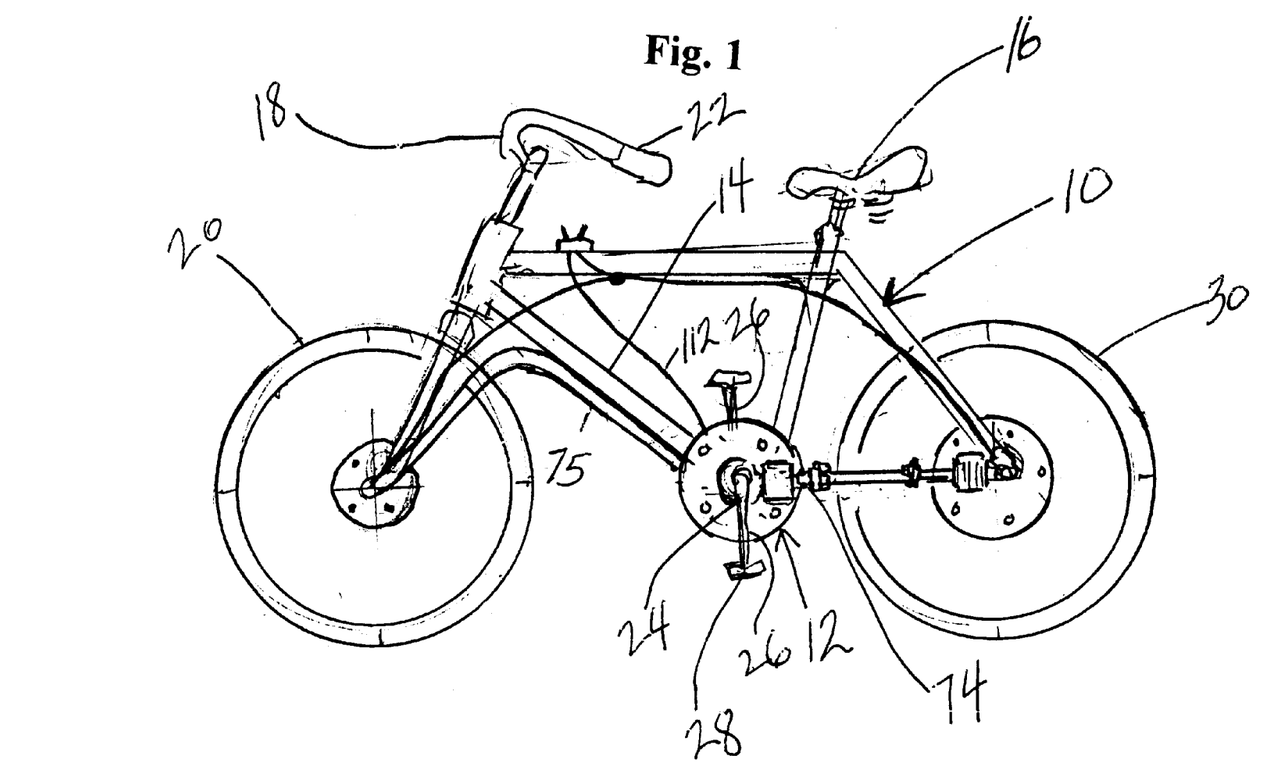
FIG. 1 is a side view of a bicycle mounting the power transmission system of this invention, illustrating the use of said system for powering the driven rear wheel, and optionally a driven front wheel.

Turning frst to FIG. 1, there is illustrated a bicycle 10 incorporating the power transmission system 12 of this invention, where a bicycle represents an exemplary use for the power transmission system 12 hereof. The bicycle 10, as known in the art, comprises a frame 14 mounting a driver's seat 16, and a front pivotal member 18 for mounting a rotatable wheel 20, where said pivoting may be by steering bars 22. Additionally, the frame 14 mounts a rotating crank shaft 24, having oppositely extending pedal arms 26 and rotating pedals 28, at least a rear driven wheel 30, with the power transmission system 12 extending between and operable by said rotating crank shaft 24 for powering said rear driven wheel 30. An option of the invention is to make the front rotatable wheel also a driven wheel, as more clearly defined hereafter.

Figure 2:
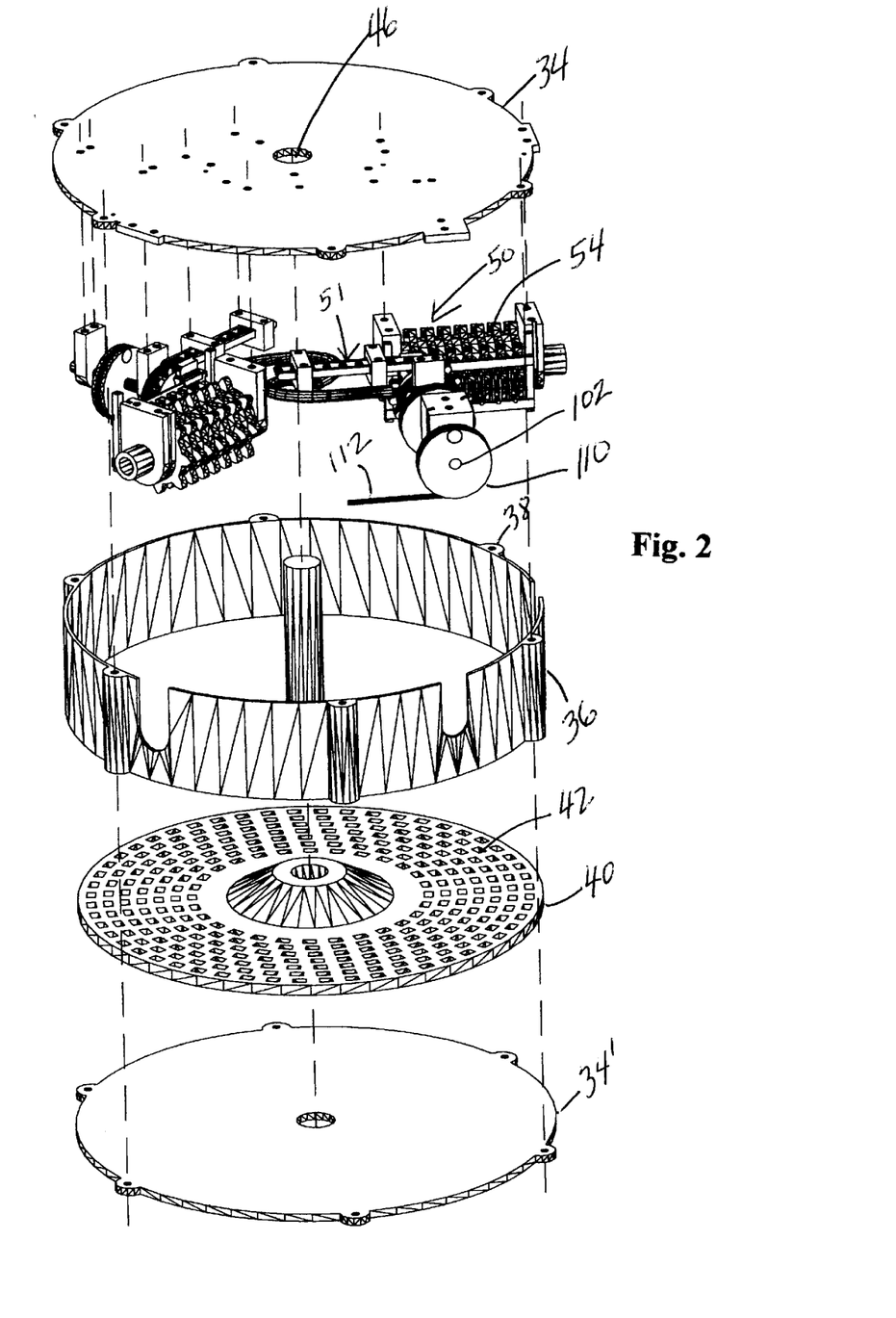
FIG. 2 is an exploded perspective view, extending between a pair of face plate members, showing the transmission assembly forming a part of the invention, where the assembly features a pinion gear plate having a series of gear teeth receiving openings arranged in concentric circles, where the pinion gear plate is rotatable by the rotating pedal member.
Figure 2A:
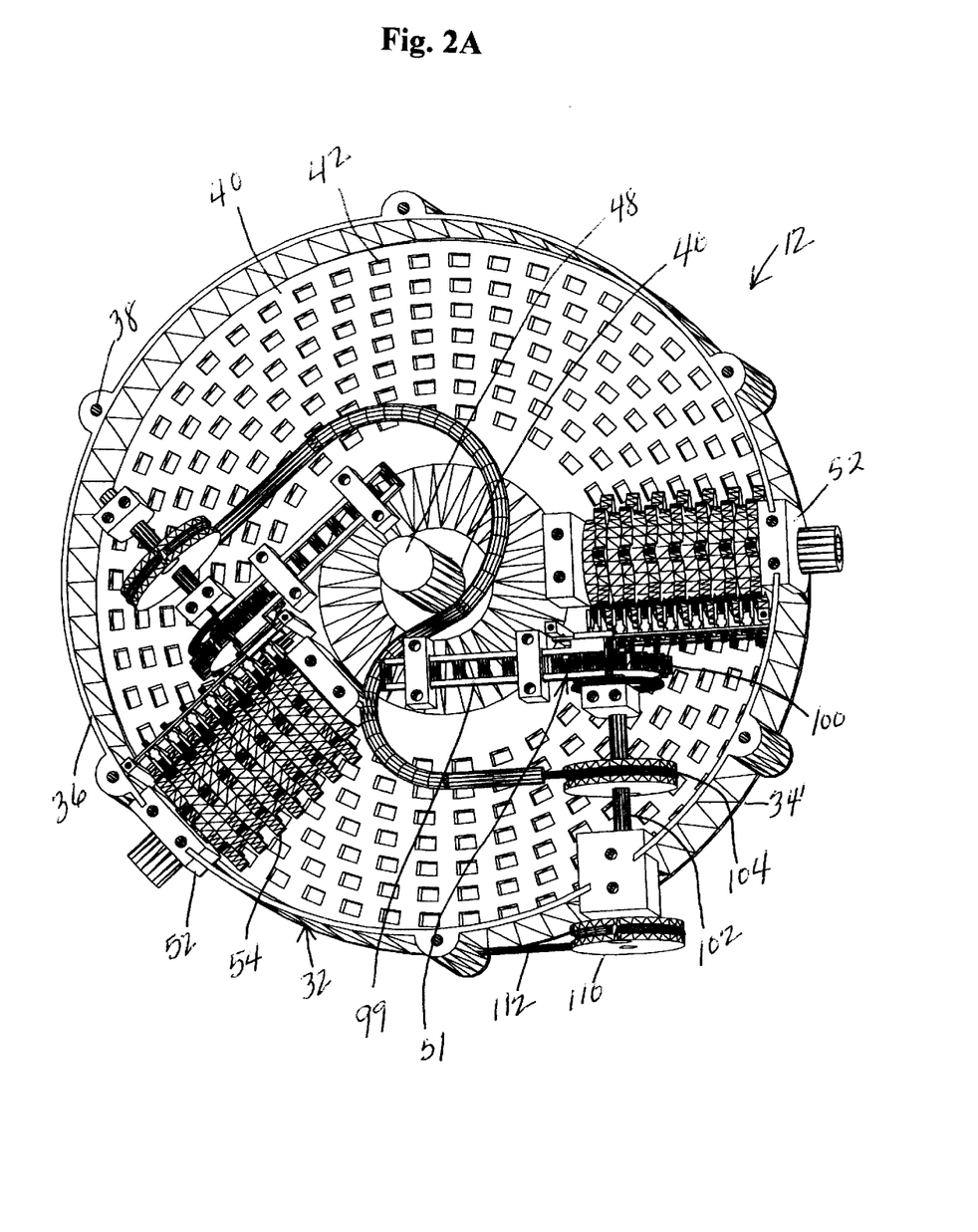
FIG. 2A is a perspective view of the assembled transmission assembly of FIG. 2 with a face plate removed to show internal details.
Figure 3:
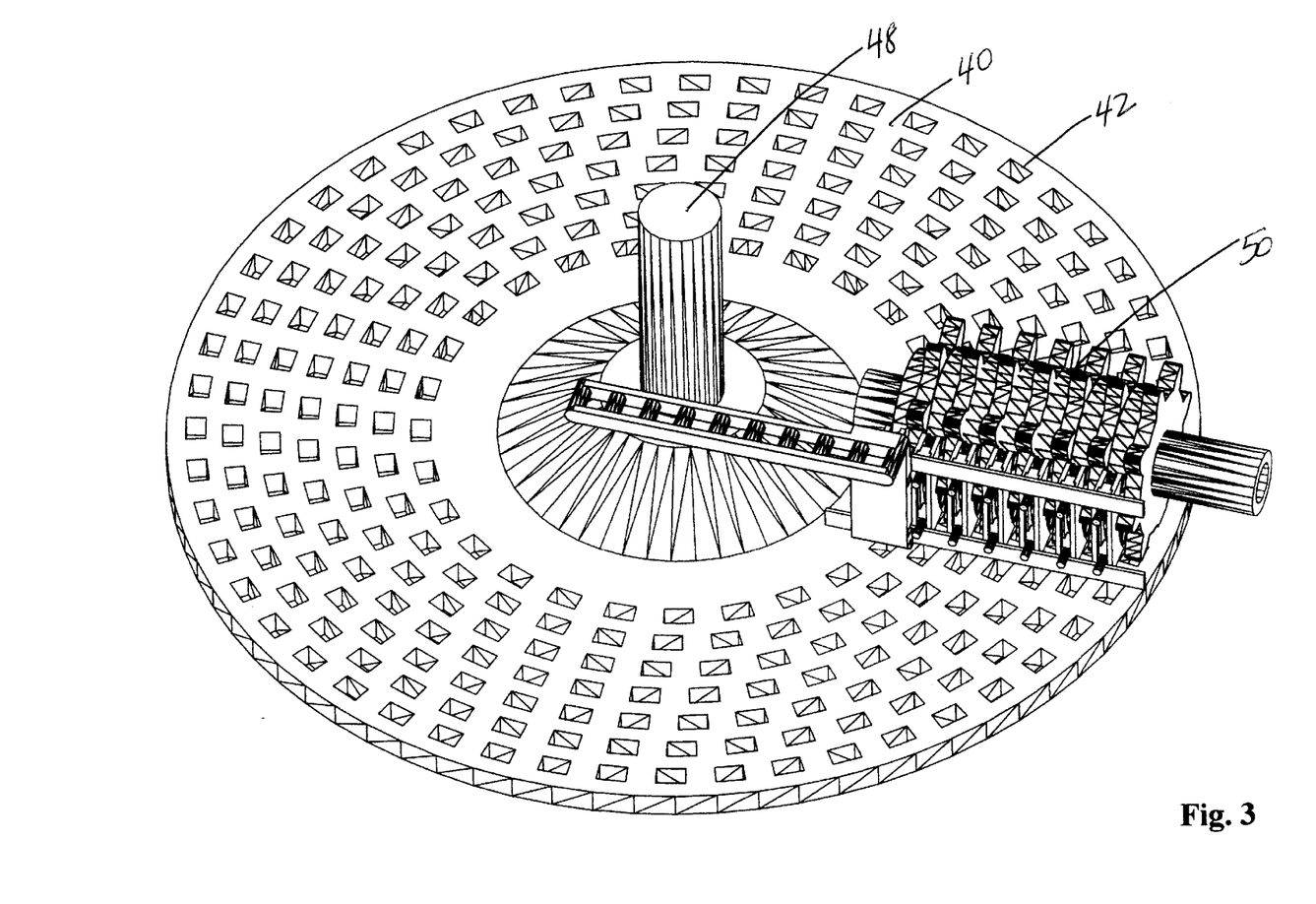
FIG. 3 is a perspective view of the pinion gear plate in FIG. 2, further showing a drive shaft and pinion gear cluster assembly and shifting mechanism.
Figure 4:
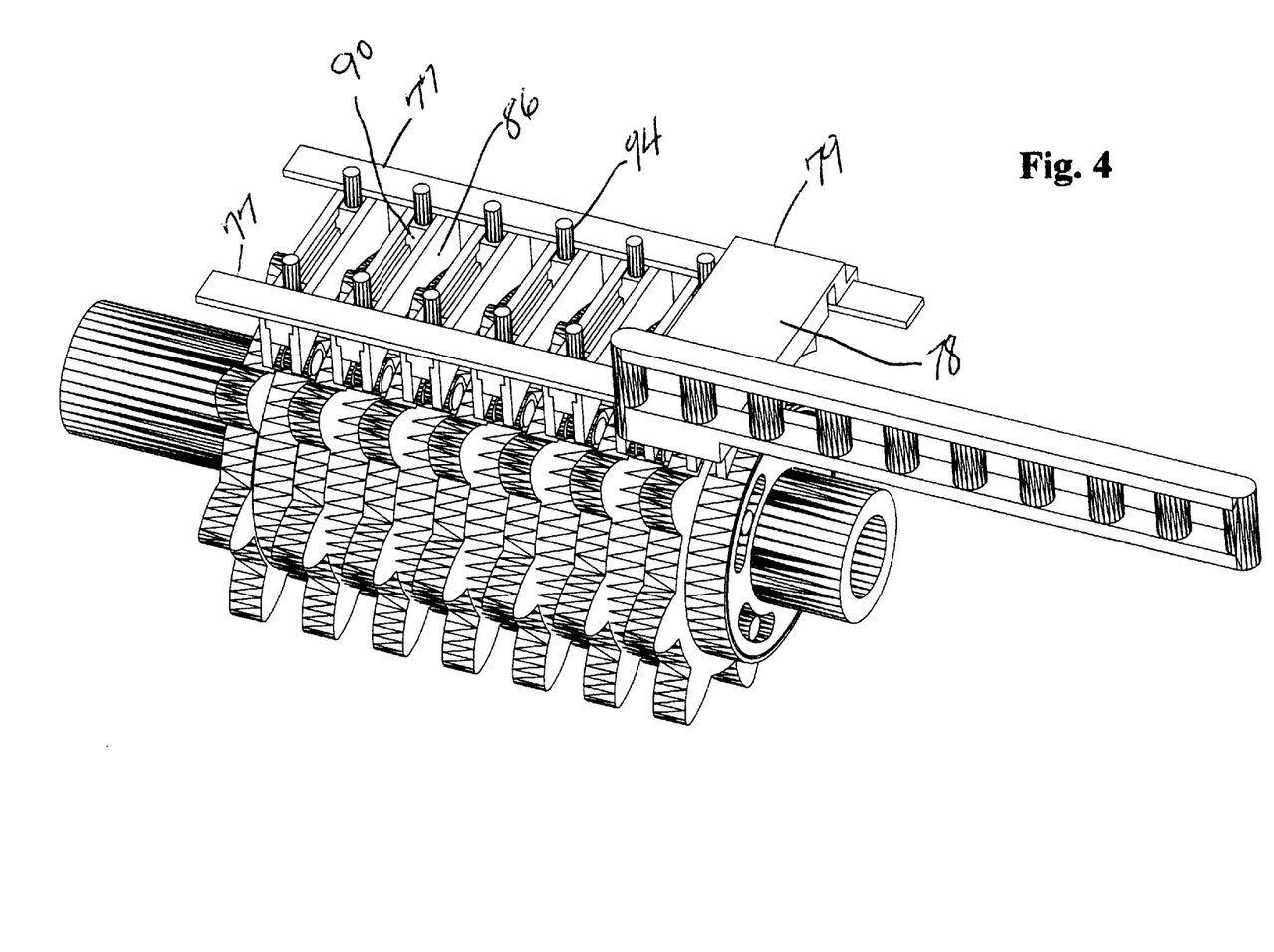
FIG. 4 is an enlarged perspective view of the pinion gear cluster assembly of FIG. 3.
Figure 5:
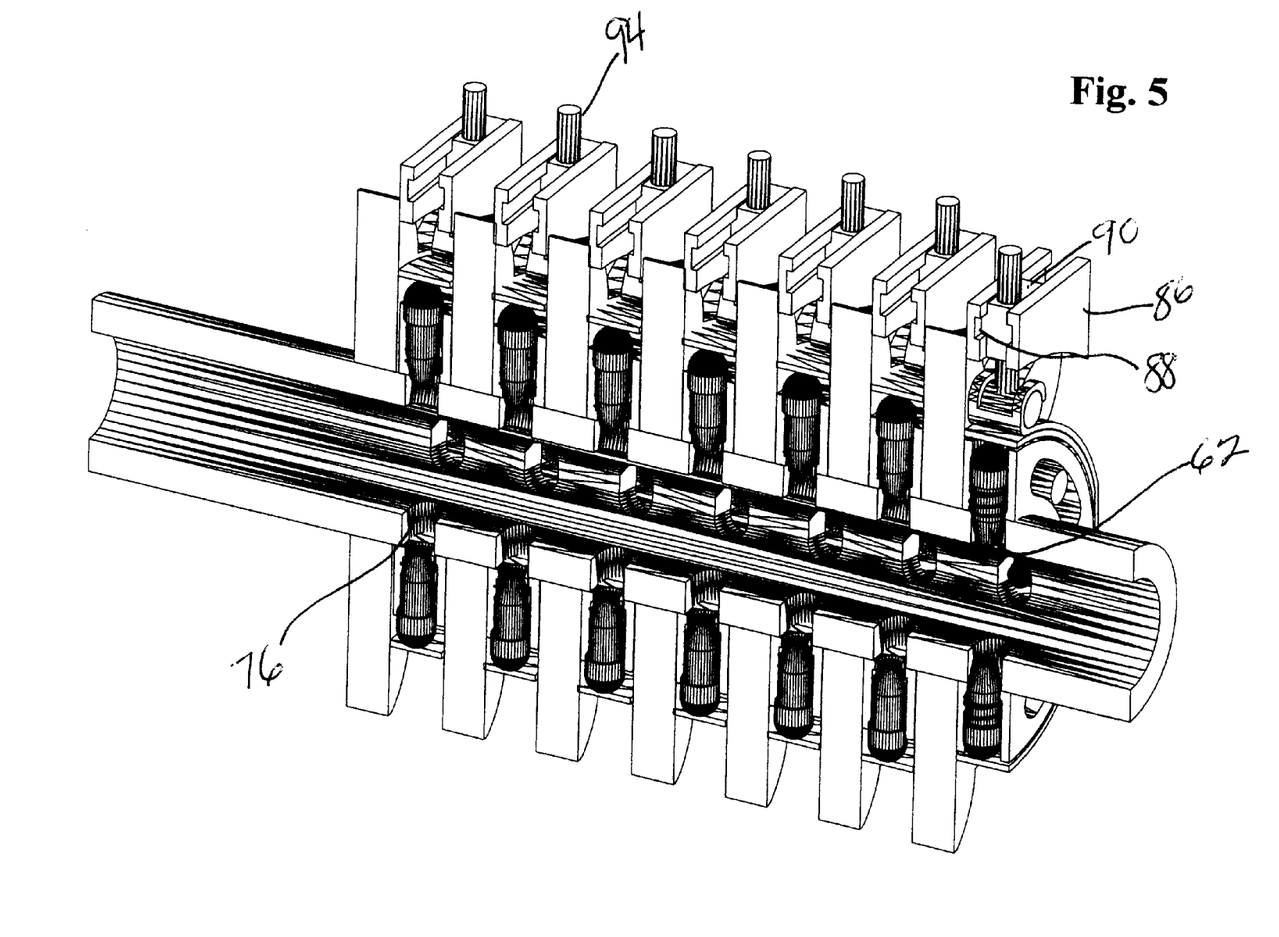
FIG. 5 is an enlarged perspective view, with parts removed, of the pinion gear cluster assembly of FIG. 3, showing the inside clutch engaged while all others are in neutral.

FIGS. 2 and 2A are two perspective views showing the transmission housing 32 and the various contained components forming the integral element of the power transmission system of this invention. The housing 32 is formed by a pair of spaced apart side plate members 34, 34', only one being shown in FIG. 2A to help illustrate the internal components, and a peripheral wall 36 joining the respective side plate members. For mounting the side face members the peripheral wall 36 may include plural fastener receiving holes 38, as known in the art. Within the housing 32 is a rotating pinion gear plate 40 featuring a plurality of openings or recesses 42, where said openings or recesses are arranged in a series of concentric circles from the plate periphery 44 toward the center 46 of the plate. The plate 40 is rotatable about a shaft 48 which is the rotating crank shaft 24. Additionally, the housing 32 mounts at least one radially positioned cluster assembly and shifting mechanism 50, as more fully described and illustrated in the later Figures. FIGS. 3 and 4 illustrate the operating relationship between the pinion gear plate 40 and at least one cluster assembly and shifting mechanism 50.

FIGS. 5 through 12 illustrate details of the shifting mechanism 50. Before discussing the details thereof, it will be noted in FIG. 2A that the shifting mechanism 50 is fixed to the peripheral wall 36 by bracket 52. Turning now to the construction of the clutch assembly and shifting mechanism 50, it comprises a plurality of pinion gears 54 (seven being shown in FIG. 4), where the number of gears are equal to the number of concentric rings of openings or recesses 42. As best seen in the exploded views of FIGS. 10 and 11, each clutch assembly includes plural pins 56 and a clutch hub 58, where said clutch hub includes a like plurality of openings for receiving said pins 56 to lock the relationship between the gear and its clutch assembly. Each said clutch hub 58 further includes plural radial openings 60 for receiving a spring biased pin 62 and compression spring 64, where the pin 62 features a head portion 66 for contacting said compression spring 64. Further, each said clutch hub 58 has an associated, continuous encircling band 67, where the bands 67 are shown in an expanded or non-engaged position in FIGS. 10 and 11. Finally, the respective ends of each said band 67 includes an outwardly directed looped portion 68, the function of which will become clearer in the description which follows.

Figure 10:
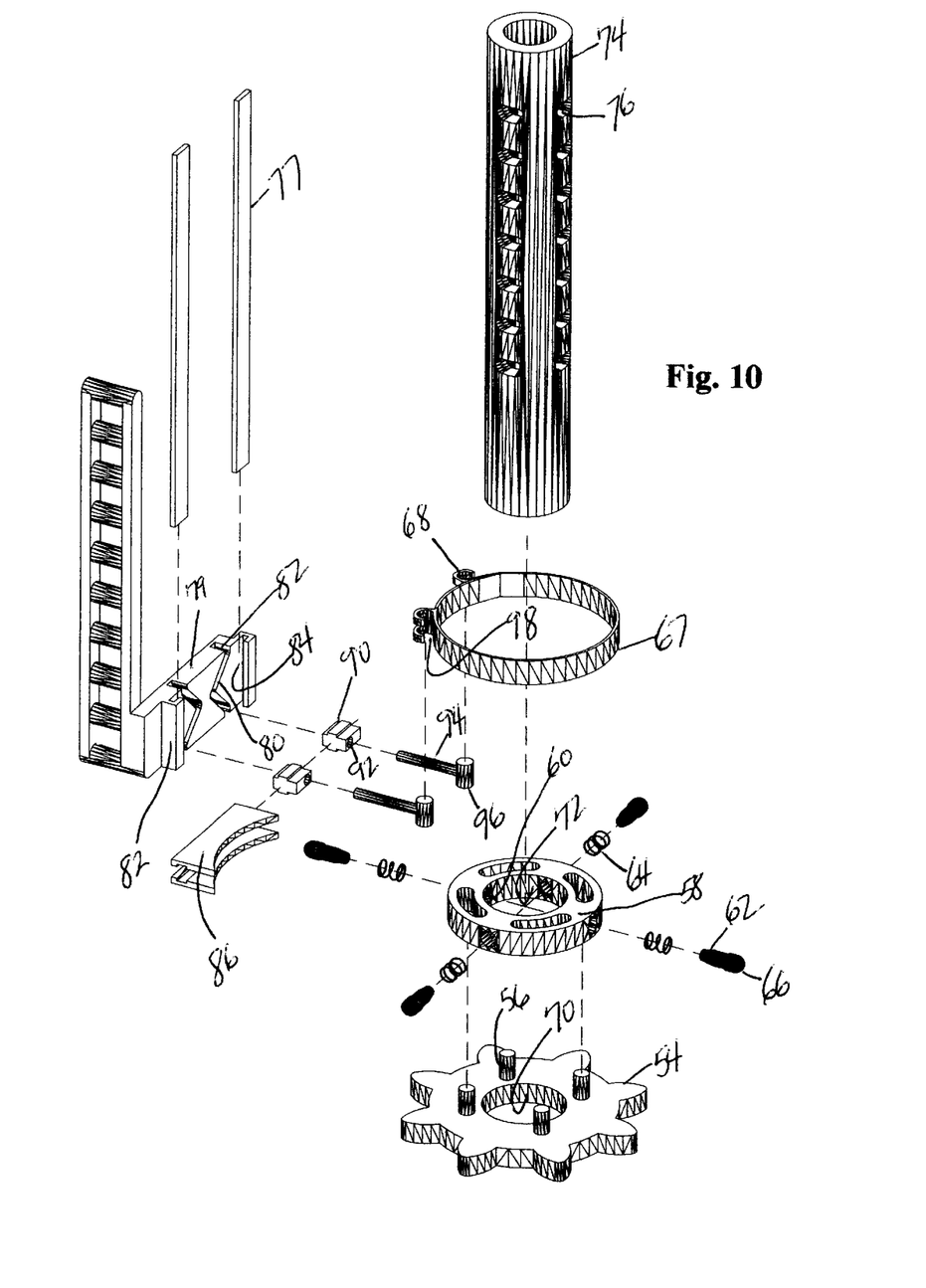
FIG. 10 is an exploded perspective view showing the various components forming the pinion gear and cluster and mechanism of FIG. 5, illustrating further the clutch hub and shifting rack.
Figure 11:
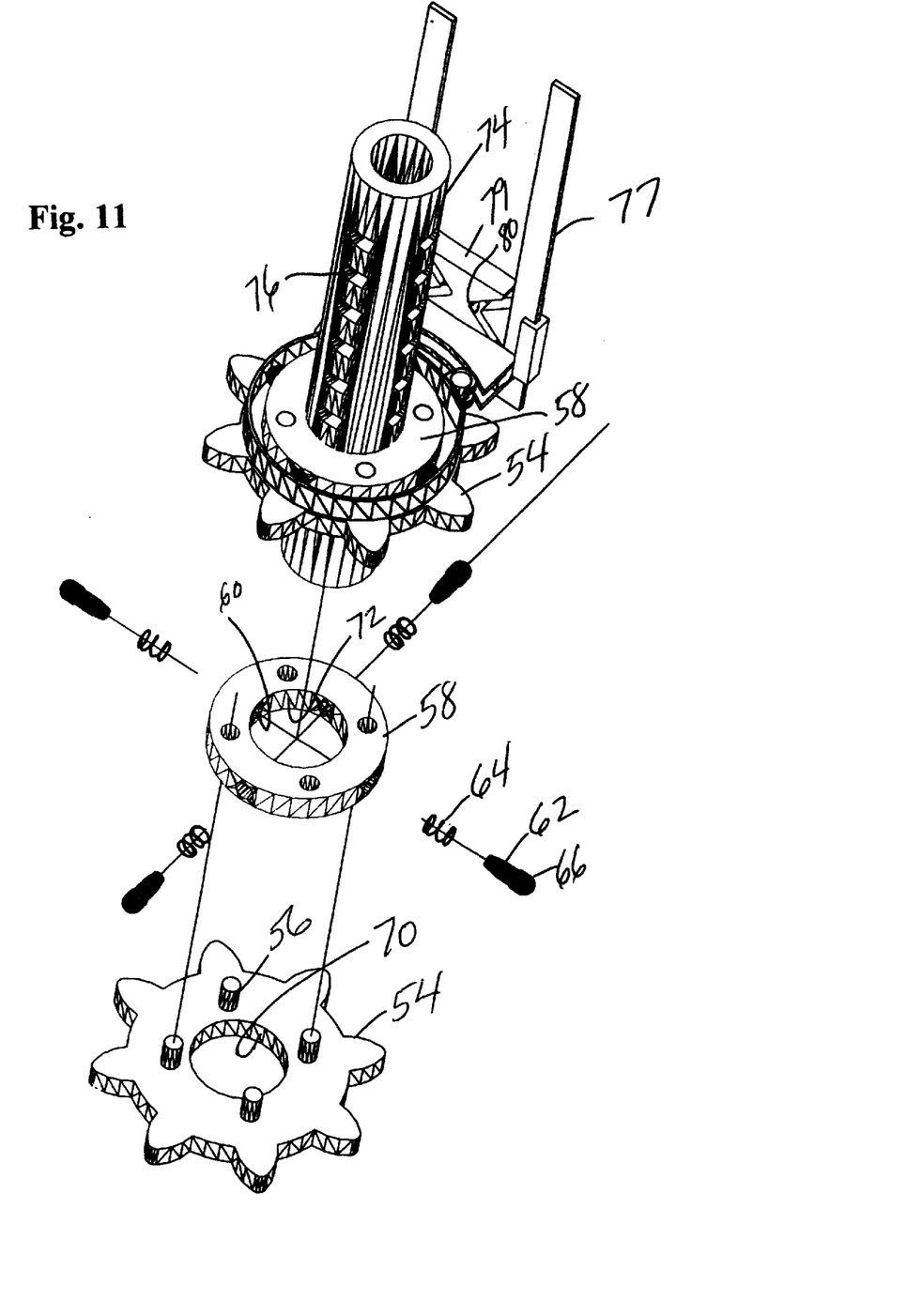
FIG. 11 is a partially assembled and partially explosive perspective view of the assembly of FIG. 10.

The respective gears and clutch assemblies include central openings 70, 72 of a size for rotative engagement with a pinion gear shaft 74, where the shaft features plural rings of recesses 76 arranged to be aligned with the plural openings 60. Thus, in a neutral or non-engaging mode all the gears and their associated clutch assemblies are not engaged with the shaft 74, but in the engaged or active position only one gear and its associated clutch assembly is fixed to the shaft 74. The manner by which the one gear may be engaged will now be described.

Figure 6:
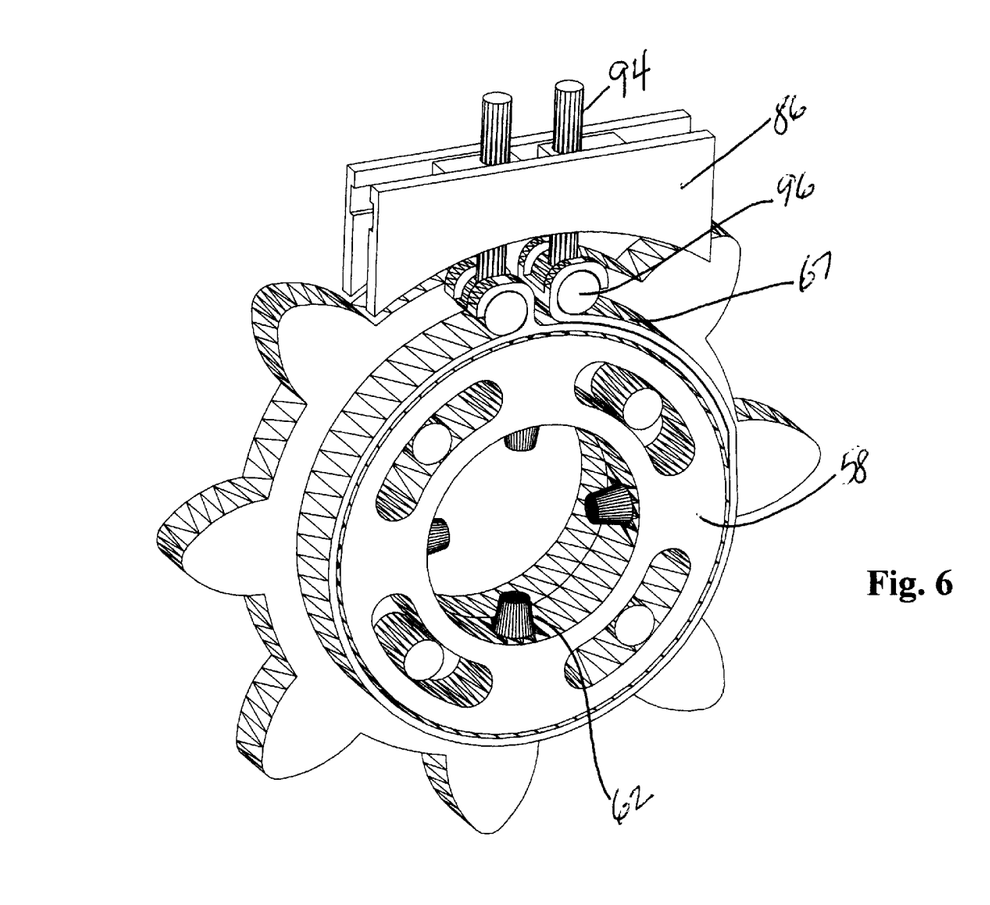
FIG. 6 is a perspective view of the pinion gear with clutch cluster assembly and shifting mechanism hereof, showing a single pinion gear and clutch in the engaged mode.
Figure 7:
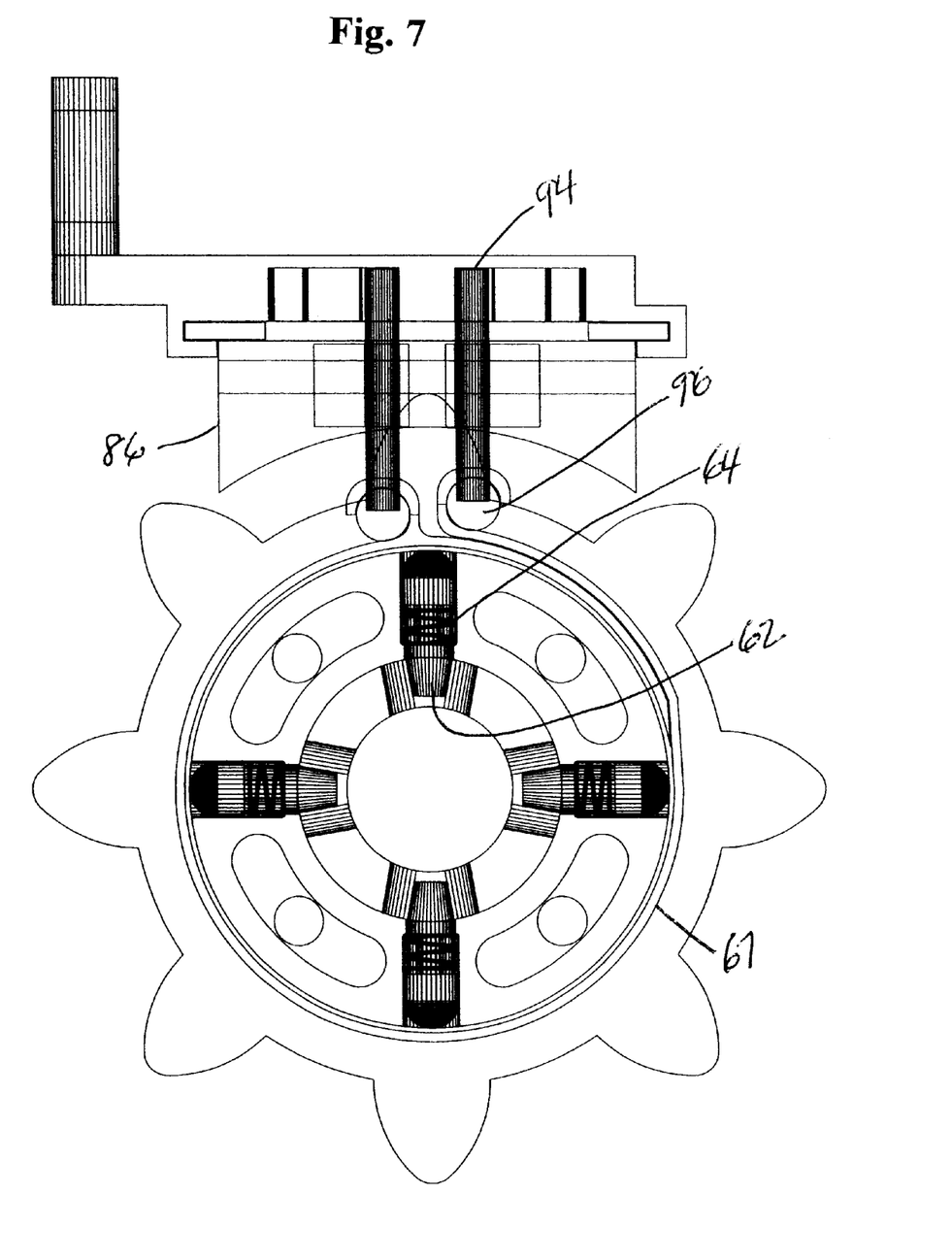
FIG. 7 is a top view of the assembly of FIG. 6.
Figure 8:
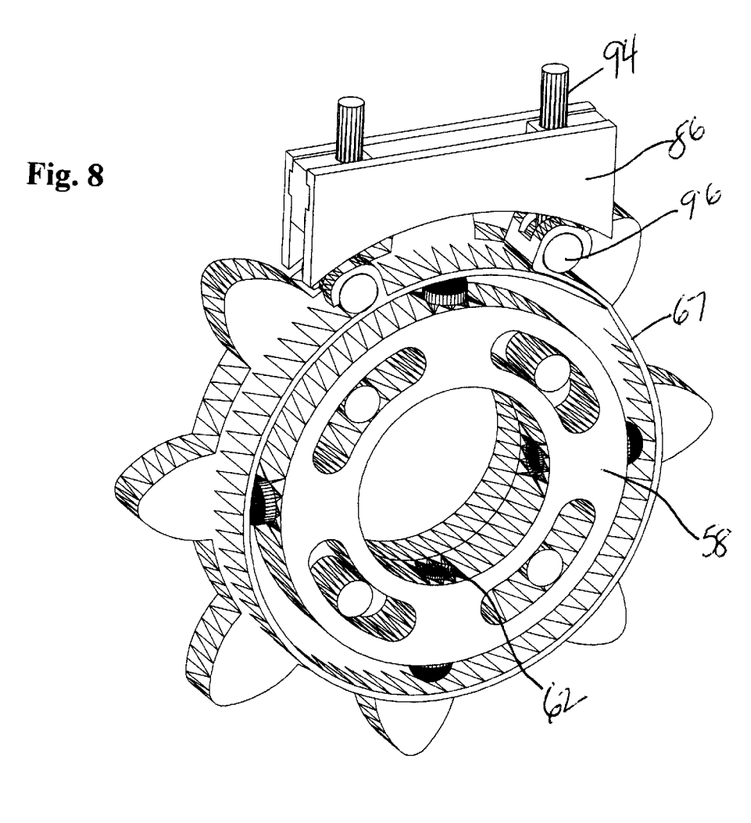
FIG. 8 is a perspective view similar to FIG. 6, showing a single pinion gear in the neutral mode.
Figure 9:
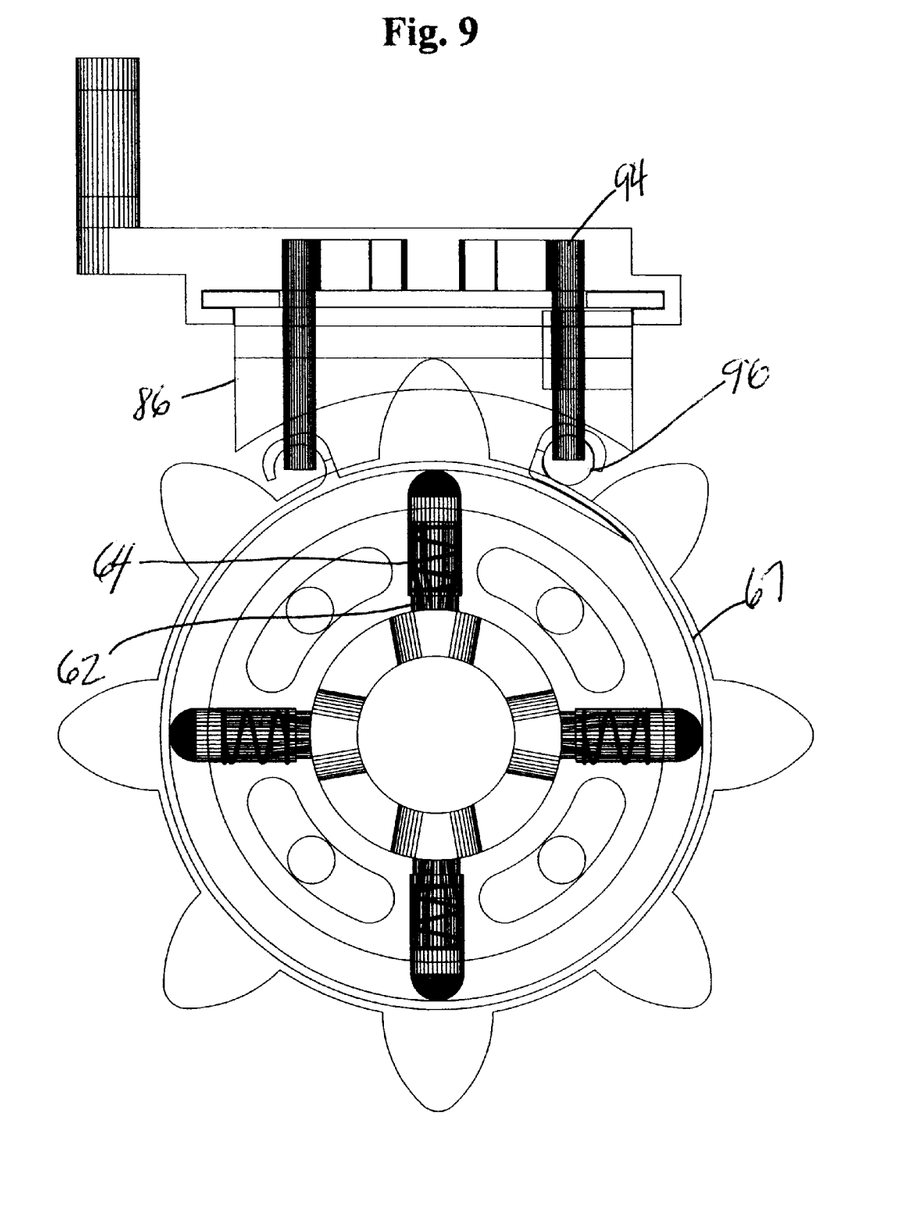
FIG. 9 is a top view of the assembly of FIG. 8.

Returning to FIG. 4, the shifting mechanism 51, as also seen in FIG. 10, comprises a pair of sliding rails 77 with a slidable housing member 79 movable therealong. The slidable housing member 79 features a body portion 78 having a pair of camming tracks 80, opening to the respective side walls 82, and opposing, inwardly directed side portions defining opposing slots 84 for sliding along the rails 77. Mounted to the pair of rails 77 are plural cross members 86, where said cross members feature opposing slots 88 for receiving sliding elements 90 with the movement therebetween is away and toward one another. Each sliding element includes a through aperture 92 for receiving a pin 94, with each pin mounting a transverse head portion 96. The head portion 96 is sized to be received within the outwardly directed looped portion 68, where the head portion 96 moves into the grasp of the looped portion through the gap 98. Note FIG. 10 where the transverse oriented body portion 79, and the camming track side wall openings 82 are aligned initially with the plural pins 94 extending upward between the rails 77. As the body portion 79 moves along the opposing rails 77 a first set of pins 94, associated with a clutch assembly 54, enters the side wall openings 82 where the pins are forced along the camming tracks. As the pins 94 move along the camming tracks 80, the continuous encircling band 67 begins to contract about its associated clutch hub 58 causing the spring biased pins 62 to enter into the pinion gear shaft recesses 76 to thereby fix said clutch hub and its associated pinion gear thereto (FIGS. 6 and 7).

Figure 12:
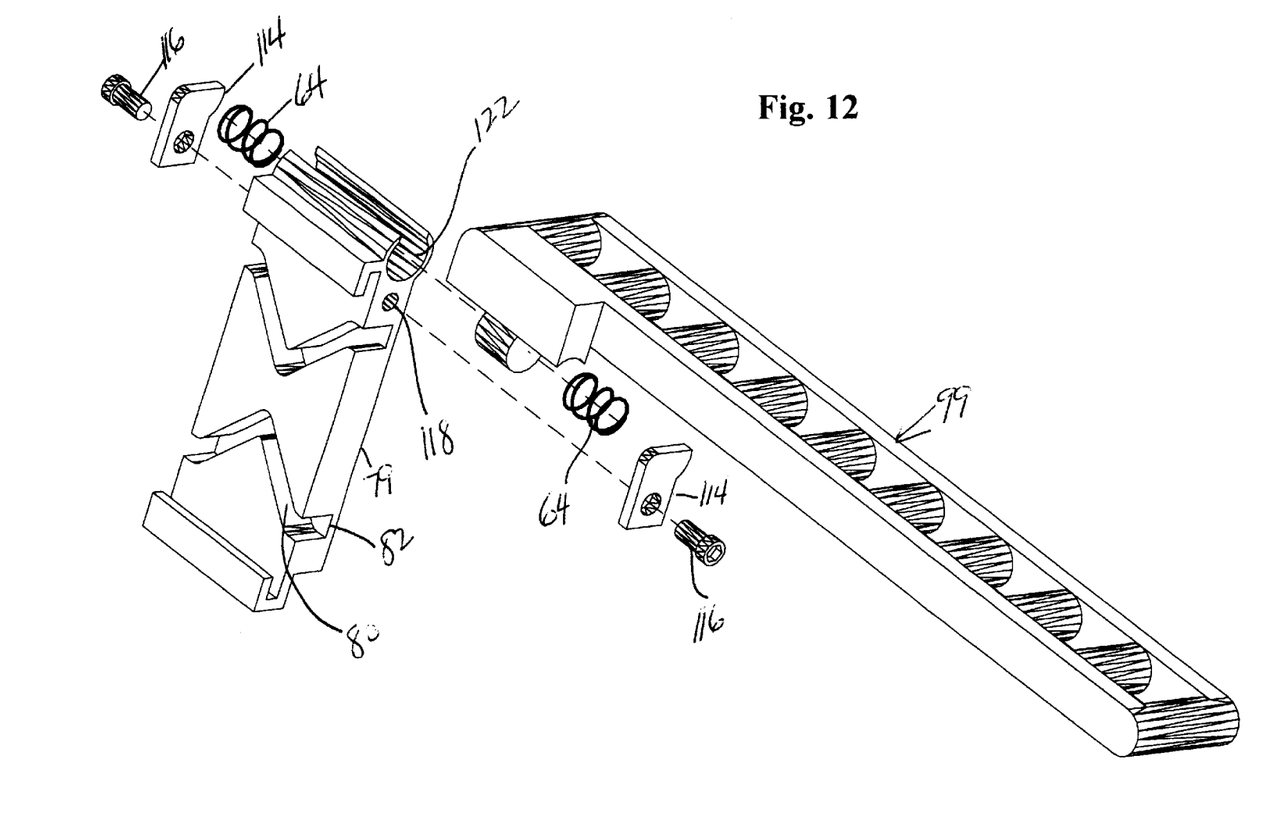
FIG. 12 is a partial perspective view of the sliding shifting mechanism with gear and rack according to this invention.

FIGS. 2 and 12 illustrates a remote shifting system for the invention hereof To effect said remote shifting, a ladder like extension 99, herein called a gear rack, is provided along said movable housing member 79, where movement of said gear rack will cause the housing member 79 to move relative to the rails 77. Movement of the gear rack 99 is achieved by interaction with gear 100 mounted for rotative movement on shaft 102. The shaft at a midpoint, in the case of a pair of driven wheels (FIG. 2), is provided with a wheel element 104 operating a flexible, fixed line 106 for operating the second shifting mechanism 51 for the second driven wheel. Further, externally of the housing 32, at the free end 108 of shaft 102, a fixed rotary wheel 110 is provided. In a manner well known in the art, a flexible, fixed wire lead 112 may be connected thereto at one end, with the opposite end positioned for easy shifting by the operator.

Rotative action from the shifting mechanism is accomplished by power drive shaft 74, where the shaft connects with a universal joint, as known in the art, to the driven wheel. In the case of the in-line rear wheel the drive shaft is inflexible, while for the off-line front wheel the drive shaft may be a flexible power transmission shaft, as known in the art. For a simple multi-speed cycle type vehicle, a single transmission housing is provided at the pedal rotating mechanism. That is, there will be the number of gears as represented by the number of concentric rings of recesses. In the illustrated example of the several Figures, there are seven concentric said recesses, and hence the capability of seven speeds. However, if a larger number of speeds are desired, such as twenty-one, by way of example, the respective driven wheels may be equipped with a comparable transmission housing, such as illustrated in FIG. 2. If for example, the driven wheel has three concentric rings of recesses, and a complementary shifting mechanism, the number of speeds available is twenty-one, or 7×3. Also, if one is especially concerned with both front and rear wheel drive, by the use of a single remote shifting wire, utilizing a splitter, one can obtain the desired synchronized shifting of the multi-wheel drive. Thus, this invention offers considerable versatility in providing a multi-speed cycle type vehicle.

FIGS. 10 and 11 illustrate in more detail the gear track and slidable shifting mechanism according to this invention. The purpose of this addition to the slidable shifting mechanism and gear rack assembly is to compensate for any misalignment that might occur between the slip pins 62 and their respective recesses 76 in the pinion shaft 74 during shifting. The sliding element 120 which is an integral part of the gear rack 99 moves within the cylindrical guide 122 which is an integral part of the slidable shifting mechanism 78. The sliding element 120 is centered between two opposing compression springs 64. Each compression spring 64 is held in place by the spring retainers 114 which are held in place by the retaining bolts 116. Should any misalignment occur between the slip pins 62 and their respective recesses 76 in the pinion shaft 74 in the pinion shaft 74 during shifting, a momentary hesitation in the movement of the slidable shifting mechanism 78 along the slide rails 77 will occur. However, the gear rack 99 will still move into its intended indexed shifting position because the sliding element 120 is able to slide forward in the cylindrical guide 122 causing the compression spring 64 to compress. When the slip pins 62 align with the recesses 76 in the pinion shaft 74, the pressure exerted on the slidable shifting mechanism 78 by the compressed spring 64 snaps the slidable shifting mechanism 78 along the slide rails 77 to its intended indexed shifting position. During normal shifting were no misalignment occurs the sliding element 120 stays centered in the cylindrical guide 122 because of equal forces exerted on it by the opposing compression springs 64.

It is recognized that changes, variations and modifications may be made to the power transmission systems of this invention, particularly by those skilled in the art, without departing from the spirit and scope thereof. Accordingly, no limitation is intended to be imposed thereon except as set forth in the accompanying claims.

What is claimed is:

1. A power transmission system for a cycle vehicle for providing multi speeds thereto, where said vehicle includes a frame, and at least a pair of wheels mounted for rotative movement on said frame, said power transmission system comprising:

a pedal powered first transmission assembly mounted on said frame and in power transmission communication with at least one said wheel, said assembly comprising a generally circular housing mounting a rotating crank shaft, said shaft including a circular pinion gear plate having a series of recesses arranged in plural concentric rings about said shaft, a pinion gear and clutch cluster assembly, and radially oriented shifting mechanism mounted to said housing in close proximity to said circular pinion gear plate, said pinion gear and clutch assembly and shifting mechanism including means for transmitting power to at least one said wheel and plural rotative gears, one gear for each said concentric ring, where at any given time one of said gears and accompanying clutch assembly is in an operating engagement with the said recesses of a complementary concentric ring of recesses on said pinion shaft, whereby rotation of said crank shaft and pinion gear plate effects rotation of a selected said pinion gear engaged to said pinion shaft which in turn effects a transfer of power through said drive shaft to said at least one wheel.

2. The power transmission system according to claim 1, wherein said housing further comprises a pair of spaced apart side face members joined by a peripheral wall, and said shaft extends through said side face members, where said shaft mounts a pair of arms with each mounting a rotary pedal for rotation by the operator of said vehicle.

3. The power transmission system according to claim 1, wherein said pinion gear and clutch assembly and shifting mechanism includes a pinion shaft receiving said plural rotative gears and an associated clutch assembly for each said pinion gear, where each said clutch assembly includes means for fixing it in rotative relationship with its complementary pinion gear and said pinion shaft includes recesses underlying each said clutch assembly, whereby means are provided in each said clutch assembly for removably engaging said clutch assembly to said pinion shaft.

4. The pwer transmission system according to claim 3, wherein said means for removably engaging said clutch assembly to said pinion shaft comprises plural, radially directed spring biased pins for engaging the recesses of said pinion shaft.

5. The power transmission system according to claim 4, including a constricting band about each said clutch hub, wherein movement of said spring biased pins is effected by constricting said band to a position contiguous with said clutch hub to thereby push said pins into selected said pinion shaft recesses.

6. The power transmission system according to claim 5, wherein said band is constricted by a pair of second pins moved toward one another, and a slide housing having a pair of camming tracks for receiving and moving said second pins toward and away from one another.

7. The power transmission system according to claim 6, wherein said slide housing is slidably mounted for movement along a pair of rails.

8. The power transmission system according to claim 1, wherein said at least one wheel includes a second transmission assembly having a circular sprocket plate with a series of recesses arranged in plural concentric rings, a pinion gear and clutch cluster assembly and shifting mechanism mounting plural gears and accompanying clutch assembly, one for each said concentric ring of recesses, where the range of available speeds is the product of said concentric rings of said first and second transmission housings.

9. The power transmission system according to claim 7, including remotely operated means for shifting said slide housing, where said means is mounted on said frame.

10. The power transmission system according to claim 9, wherein said frame mounted means includes a sliding member in proximity to said gears, said sliding member containing a gear rack formed of a pair of parallel rails having plural cross members extending therebetween, said gear rack cooperating with a rotary gear member to effect movement of said gear rack.

11. The power transmission system according to claim 10, wherein said rotary gear member is mounted on a rotary shaft, and said rotary shaft may be remotely operated by the operator of said vehicle.

12. The power transmssion system according to claim 9, wherein said sliding member includes a housing member having a pair of opposing camming tracks, and each said gear includes a pair of pins movable along said camming tracks to effect engagement of said selected gear with said shaft.

* * * * *